Feb. 1, 1966 PALLE-FINN BEER 3,233,045
MICROPHONE SWITCH CONTROLLED MULTI-SPEED RECORDER-REPRODUCER
Filed Feb. 12, 1962
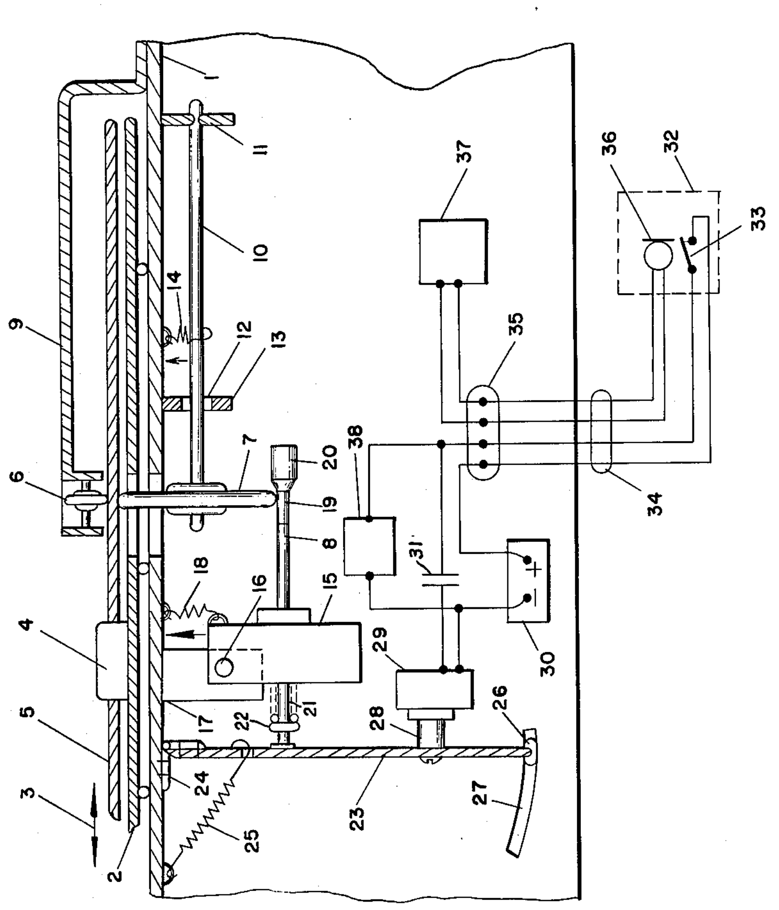
INVENTORS
PALLE-FINN BEER
BY Larson and Taylor
ATTORNEYS United States Patent Office 3,233,045

Patented Feb. 1, 1966

3,233,045
MICROPHONE SWITCH CONTROLLED MULTI-SPEED RECORDER-REPRODUCER

Palle-Finn Beer, Lidingo, Sweden, assignor to AGA Aktiebolaget, a corporation of Sweden Filed Feb. 12, 1962, Ser. No. 172,674
Claims priority, application Sweden, Feb. 15, 1961, 1,543/61
2 Claims. (Cl. 179—100.1)

In apparatus for recording as well as reproducing sound it is known to provide means whereby the speed of the sound record carrier during reproduction can be adjusted to different values, the record carrier being given a constant speed during recording The apparatus is then preferably constructed to automatically adjust its speed to the said constant value when switched from reproducing to recording.

In apparatus of said type which are provided with a separate microphone connectable to the apparatus through a conductor, it has been necessary to provide the said adjustment in the apparatus itself and there were no facilities for remote-control from the microphone.

The present invention relates to an improvement of the known type of apparatus, and comprises a switching means provided therein for adjusting it to the constant recording speed, the switching means being manually controllable at the apparatus as well as adapted to be responsive to a switch from reproducing to recording performed at the microphone.

An embodiment of the invention is described below with reference to the attached drawing shownng diagrammatically the elements of the apparatus that are of importance for the invention. The single figure of the drawing shows an elevational view of the apparatus, with parts in section and other parts represented schematically.

The sound-recording and reproducing apparatus shown on the drawing is provided with a base-plate 1 with a carriage 2 thereon, which is reciprocable in the direction of the arrows 3. The carriage has a pivot 4, on which a disc 5 may turn. The disc carries on one side a magnetizable coating cooperating with a recording head not shown on the drawing, as it is assumed to be of known construction and forms no part of the present invention.

Displacement of the disc 5 and also of the carriage 2 in the direction of the arrows 3 is obtained by the cooperation of a guiding wheel 6 with a spiral groove provided on the top-side of the disc at the same time as the disc is driven from the underside by an intermediate wheel 7, which is in contact with and driven by a driving shaft 8. The guiding wheel 6 may be supported by a supporting member 9 integral with the base plate 1. The intermediate wheel 7 is assumed to be rotatable on a shaft 10, which is supported in a bracket mounted on the base plate 1 and is guided by a slot 12 of a second bracket 13. Furthermore, the spring 14 may act on the shaft 10 to draw it towards the base plate 1 and provide contact between the intermediate wheel 7 and the disc 5.

Preferably, the shaft of a motor 15 serves as the driving shaft 8, the motor being mounted pivotally on pivots 16 supported by a bracket 17 joined to the base plate 1. The motor 15 is further acted on by a spring 18 for providing good frictional engagement between the driving shaft 8 and the intermediate wheel 7.

Different speeds of the record carrier 5 are obtained by means of portions 19 and 20 of the driving shaft having different diameters and which may be alternatively engaged by the intermediate wheel 7. A switch from one portion to the other may be obtained in the embodiment shown by axial displacement of the driving shaft 8. The driving shaft 8 is further subjected to a spring 21 which may be tensioned between a flange 22 provided on the shaft and the rotor, not shown on the drawing, of the motor 15. The spring 21 tends to move the driving shaft in such a direction as to make the intermediate wheel 7 cooperate with the portion 20 and, furthermore, the shaft 8 may be actuated by a switching means 23 for displacement of the shaft 8 to a position in which the intermediate wheel engages instead the portion 19 of the shaft 8.

The switching means 23 in the embodiment of the invention illustrated comprises a lever which is pivotably connected to the base plate 1 such as by hinges 24.

The lever 23 may be subjected to a spring 25 tensioned between the base plate and the lever and tending to pull the lever 23 away from the shaft 8. Finally, the lever 23 may be provided with a manually operated member 26, for instance in the form of an adjusting knob, which is slidable in a slot 27 in the casing joined to the base plate 1 of the apparatus. With the aid of the adjusting knob 26 it is thus possible to adjust manually the speed of the record carrier of the apparatus.

The lever 23 is held in one of its terminal positions by the spring 25 holding the adjusting knob 26 at one end of the slot 27. In the other terminal position, movement of the lever 23 is limited and the lever is held in position by a locking member, which may be released manually at the apparatus and may also be released from the microphone when the apparatus is switched to recording. In principle, the locking member may be of various constructions, the embodiment shown having a permanent magnet 28 integral with the lever 23. The magnet is adapted, when the lever 23 is brought into its right-hand terminal position, to be retained by magnetic attraction from the core of an electromagnet 29.

The attraction between the permanent magnet 28 and the core of the electromagnet 29 is proportioned to make it possible to remove the lever 23 from its right-hand terminal position by means of the adjusting knob 26. Furthermore, the attraction may be removed by sending a current impulse of suitable strength and direction through the winding of the electromagnet 29. The current is derived from a D.C. source 30, to which the electromagnet 29 is connected in series with a condenser 31 and a switch 33 placed at the microphone 32. The microphone 32 is assumed to be connected through a line 34 to a terminal board 35 of the apparatus. The line 34 also contains conductors for connecting the diaphragm case 36 of the microphone to an amplifier 37 of the apparatus. The amplifier is assumed to be connected to the recording head referred to above in a known manner, which has not been shown on the drawing.

The principal object of the switch 33 is to enable switching of the apparatus from recording to reproducing. To this end, the series connection of the winding of the electromagnet 29 and the condenser 31 is connected in parallel with a relay 38 of the apparatus indicated in the drawing, through the contacts of which the required switching operations of the amplifier and other elements are controlled. When the switch 33 is closed, for instance, current is applied to the relay 38 to switch the apparatus from reproducing to recording. At the same time, there flows to the condenser 31 a charging current of such magnitude as to remove the attraction between the permanent magnet 28 and the core of the electromagnet 29. Simultaneously with the switching of the apparatus from reproducing to recording, the lever 23 may thus be turned to adjust the speed of the record carrier to the abovementioned constant value. At the end of the recording procedure, when the apparatus is to be switched back to reproduction, the switch 33 is moved to the off position and the charge stored in the condenser 31 can flow away through the relay 38. The condenser 31 is then prepared to receive a fresh charging current upon a subsequent switch from reproducing to recording.

The invention may be modified in various ways within the scope of the following claims. For instance, the retaining member for the arm 23 may comprise a ratchet-and-pawl mechanism, which may be released manually or by remote control such as through a relay. Also, it is obvious to one familiar with the art how to modify the arrangement so as to make possible switching between three speeds. The speed of the record carrier may then be fixed, as in the above, whereas in reproduction the fixed speed may be used or a higher or a lower speed.

What I claim is:

1. An apparatus for recording and reproducing sound comprising a record carrier, a motor, drive means for transferring driving force from said motor to said record carrier including means for effecting different speeds in one direction of said record carrier, manually operable mechanical switching means in said apparatus controlling said means for effecting different speeds to said record carrier, an amplifier, a separate microphone connected to said amplifier through a line, said microphone comprising a switch connected through said line with a relay for alternately switching said amplifier to recording and reproducing conditions, spring means urging said mechanical switching means into a first position corresponding to a first predetermined speed of said record carrier locking means holding said mechanical switching means against the action of said spring means in a second position corresponding to a second predetermined speed of said record carrier, said microphone switch being connected through said line with said locking means for releasing said mechanical switching means upon actuation of said microphone switch for switching said amplifier to recording conditions.

2. An apparatus as defined in claim 1, in which said mechanical switching means comprises a permanent magnet and said locking means comprises the core of an electromagnet, said permanent magnet locking said mechanical switching means in said second position by attraction to said core, said electromagnet upon actuation of said microphone switch being supplied with an electrical current having such polarity that said attraction between said permanent magnet and said core is removed, thereby permitting said spring means to bring said mechanical switching means into said first position.

References Cited by the Examiner

FOREIGN PATENTS 766,560 1/1957 Great Britain.

IRVING L. SRAGOW, *Primary Examiner.*

ANTONIO F. GUIDA, *Examiner.*